(12) United States Patent
Gramiccioni

(10) Patent No.: US 9,539,543 B2
(45) Date of Patent: Jan. 10, 2017

(54) MECHANICALLY FUSED MATERIALS FOR POLLUTION ABATEMENT IN MOBILE AND STATIONARY SOURCES

(75) Inventor: Gary Gramiccioni, Madison, AL (US)

(73) Assignee: BASF Corporation, Florham Park, NJ (US)

( * ) Notice: Subject to any disclaimer, the term of this patent is extended or adjusted under 35 U.S.C. 154(b) by 1551 days.

(21) Appl. No.: 12/361,714

(22) Filed: Jan. 29, 2009

(65) Prior Publication Data
US 2010/0189615 A1 Jul. 29, 2010

(51) Int. Cl.
*B01J 21/06* (2006.01)
*B01D 53/94* (2006.01)
(Continued)

(52) U.S. Cl.
CPC .............. *B01D 53/945* (2013.01); *B01J 21/04* (2013.01); *B01J 21/06* (2013.01); *B01J 21/066* (2013.01); *B01J 23/06* (2013.01); *B01J 23/10* (2013.01); *B01J 23/42* (2013.01); *B01J 23/44* (2013.01); *B01J 23/755* (2013.01);
(Continued)

(58) Field of Classification Search
CPC .......... B01J 21/04; B01J 21/06; B01J 21/066; B01J 23/02; B01J 23/06; B01J 23/10; B01J 23/22; B01J 23/30; B01J 23/34; B01J 23/42; B01J 23/755; B01J 23/44; B01J 23/48; B01J 23/52; B01J 23/72; B01D 2257/106; B01D 2257/302; B01D 2257/404; B01D 2257/502; B01D 2257/702; B01D 2257/708; B01D 2255/9202; B01D 2255/90; B01D 2258/012; B01D 2258/014; B01D 53/945; B01D 53/94
See application file for complete search history.

(56) References Cited

U.S. PATENT DOCUMENTS 5,286,370 A * 2/1994 Chu et al. ................ 208/120.25
6,312,622 B1 11/2001 Toshima et al.
(Continued)

FOREIGN PATENT DOCUMENTS

GB 2451864 A * 2/2009 .............. B01J 29/80
JP 2004-231952 8/2004
(Continued)

OTHER PUBLICATIONS

Of Kato et al (Journal: "Effect of Core Materials on the Formation of Hollow Alumina Microspheres by Mechanofusion Process", Journal of the American Ceramic Society, vol. 87, No. 1, 2004, pp. 60-67).*

(Continued)

Primary Examiner — Melvin C Mayes
Assistant Examiner — Smita Patel
(74) Attorney, Agent, or Firm — Womble Carlyle Sandridge & Rice LLP

(57) ABSTRACT

Described are catalyst composites containing mechanically fused components, methods of making the catalyst composites, and methods of using the catalyst composites such as in pollution abatement applications. The catalyst composites contain a core and a shell at least substantially covering the core, the shell mechanically fused to the core and comprising particles mechanically fused to each other, wherein a size ratio of the core to particles of the shell is at least about 10:1.

14 Claims, 15 Drawing Sheets

(51) Int. Cl.
| | |
|---|---|
| *B01J 21/04* | (2006.01) |
| *B01J 23/06* | (2006.01) |
| *B01J 23/10* | (2006.01) |
| *B01J 23/42* | (2006.01) |
| *B01J 23/44* | (2006.01) |
| *B01J 23/755* | (2006.01) |
| *B01J 29/70* | (2006.01) |
| *B01J 29/72* | (2006.01) |
| *B01J 29/76* | (2006.01) |
| *B01J 35/00* | (2006.01) |
| *B01J 35/02* | (2006.01) |
| *B01J 35/10* | (2006.01) |
| *B01J 37/02* | (2006.01) |

(52) U.S. Cl.
CPC ....... *B01J 29/7007* (2013.01); *B01J 29/7215* (2013.01); *B01J 29/7615* (2013.01); *B01J 35/008* (2013.01); *B01J 35/023* (2013.01); *B01J 35/1014* (2013.01); *B01J 35/1019* (2013.01); *B01J 37/0223* (2013.01); *B01D 2255/90* (2013.01); *B01D 2255/9202* (2013.01); *B01D 2257/106* (2013.01); *B01D 2257/302* (2013.01); *B01D 2257/404* (2013.01); *B01D 2257/502* (2013.01); *B01D 2257/702* (2013.01); *B01D 2257/708* (2013.01); *B01D 2258/012* (2013.01); *B01D 2258/014* (2013.01); *Y02T 10/22* (2013.01); *Y10T 428/2991* (2015.01)

(56) References Cited

U.S. PATENT DOCUMENTS

| | | |
|---|---|---|
| 6,569,393 B1 * | 5/2003 | Hoke et al. .................. 423/219 |
| 7,259,124 B2 | 8/2007 | Yen et al. |
| 2003/0036476 A1 * | 2/2003 | Arnold et al. ................ 502/325 |
| 2008/0261142 A1 | 10/2008 | Kittle |
| 2008/0314798 A1 | 12/2008 | Stockwell et al. |

FOREIGN PATENT DOCUMENTS

| | | |
|---|---|---|
| WO | 0172415 A1 | 10/2001 |
| WO | 20080025751 A1 | 3/2008 |
| WO | 20080146823 A2 | 12/2008 |
| WO | WO 2008146823 A2 * | 12/2008 ............. B01J 35/00 |

OTHER PUBLICATIONS

Salaver et al (NPL: "Air Pollution Emission Control Devices for Stationary Sources", A&WMA, published Apr. 2007 pp. 1-6).*
Stein et al, Mechanofusion for High Performance Particles. Table-Top Type Particle Composition Processor, Hosokawa Micron Mechanofusion System, 2003.

* cited by examiner

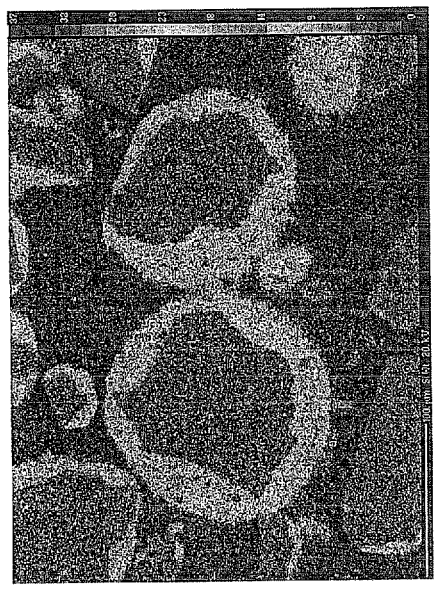
Figure 1

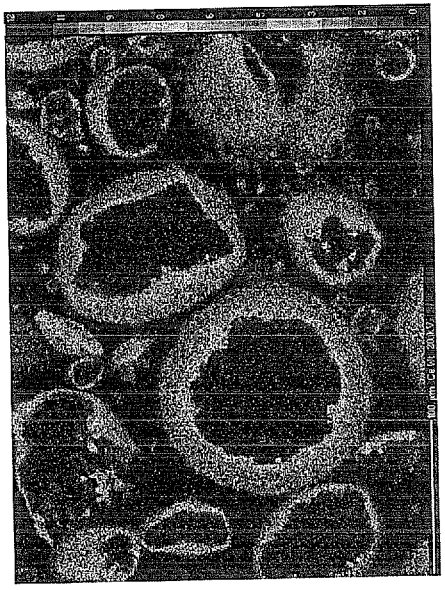
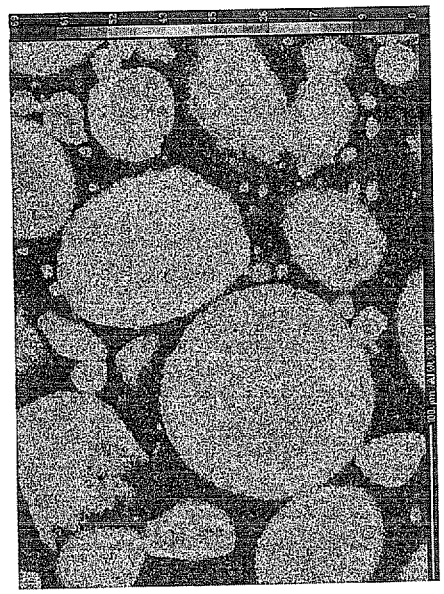
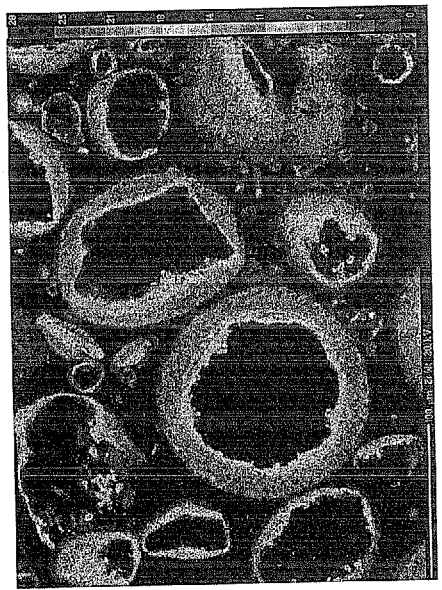
Figure 2

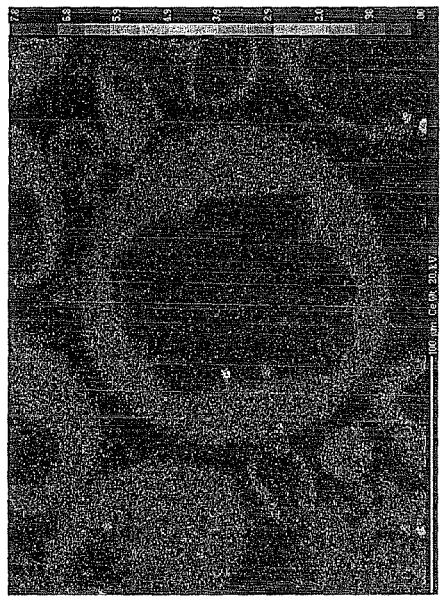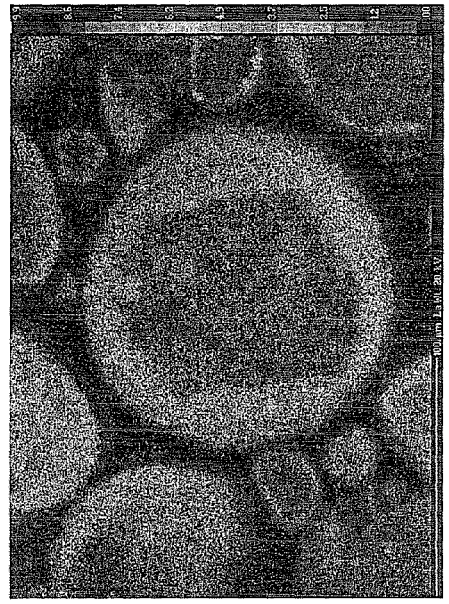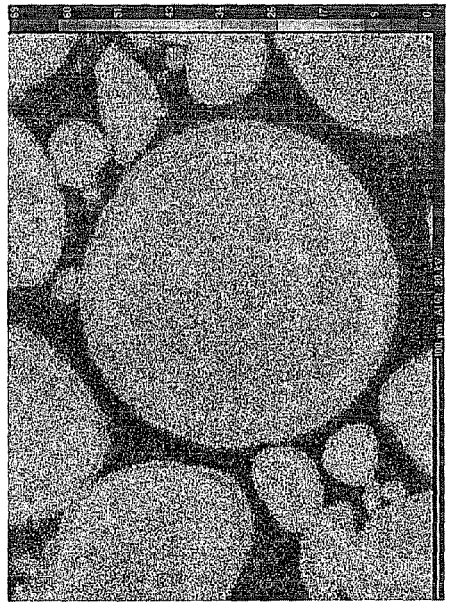
Figure 3

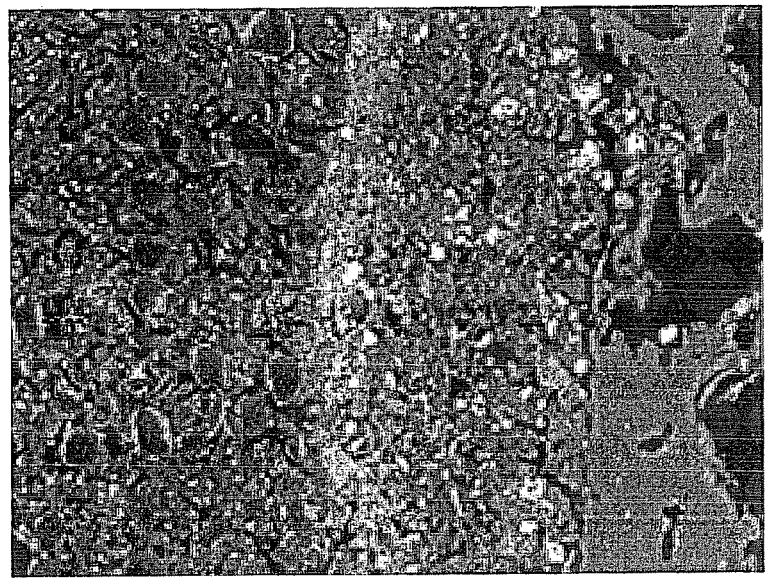
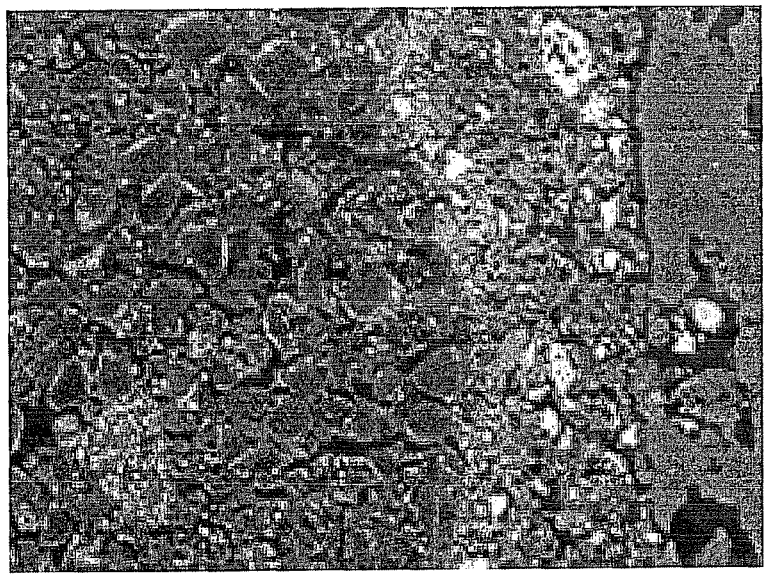
Figure 5

| Material | BET (m2/g) |
|---|---|
| Pt/Pd/Alumina (host) | 122 |
| B-zeolite (guest) | 530 |
| MF-11 (3% β) Actual | 130 |
| Theoretical MF-11 | 134 |

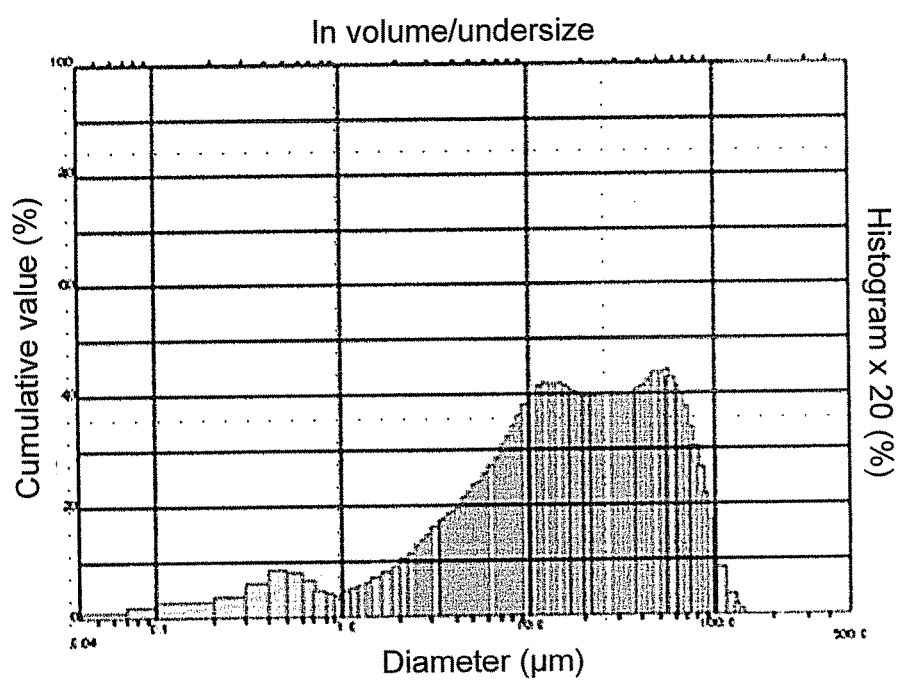
Figure 12

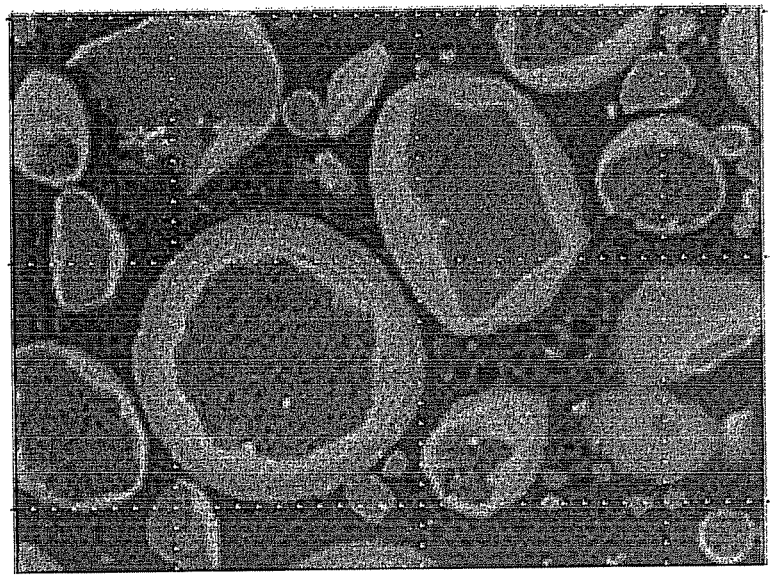
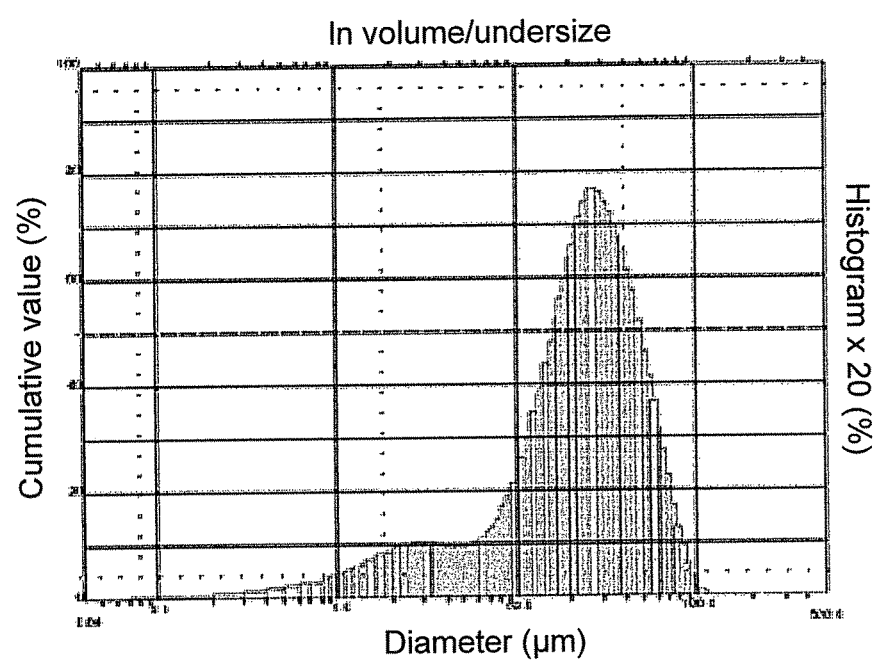
Figure 13

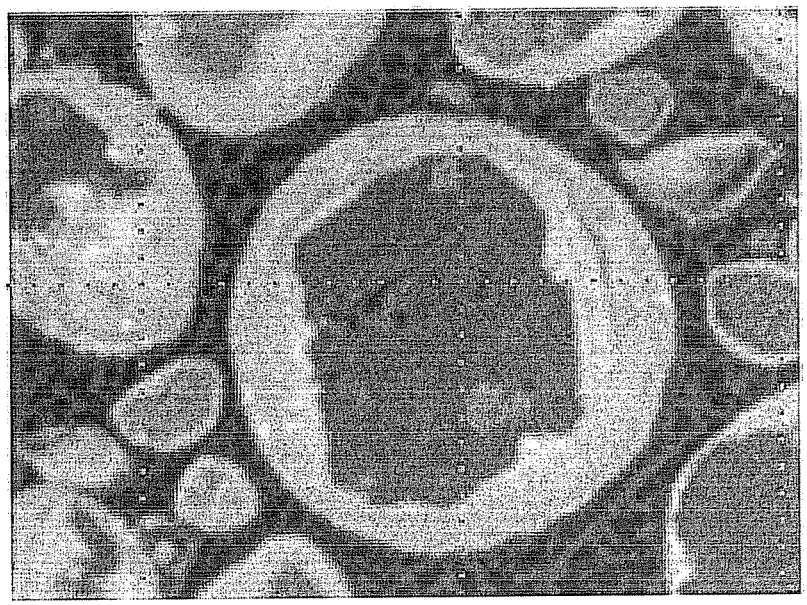
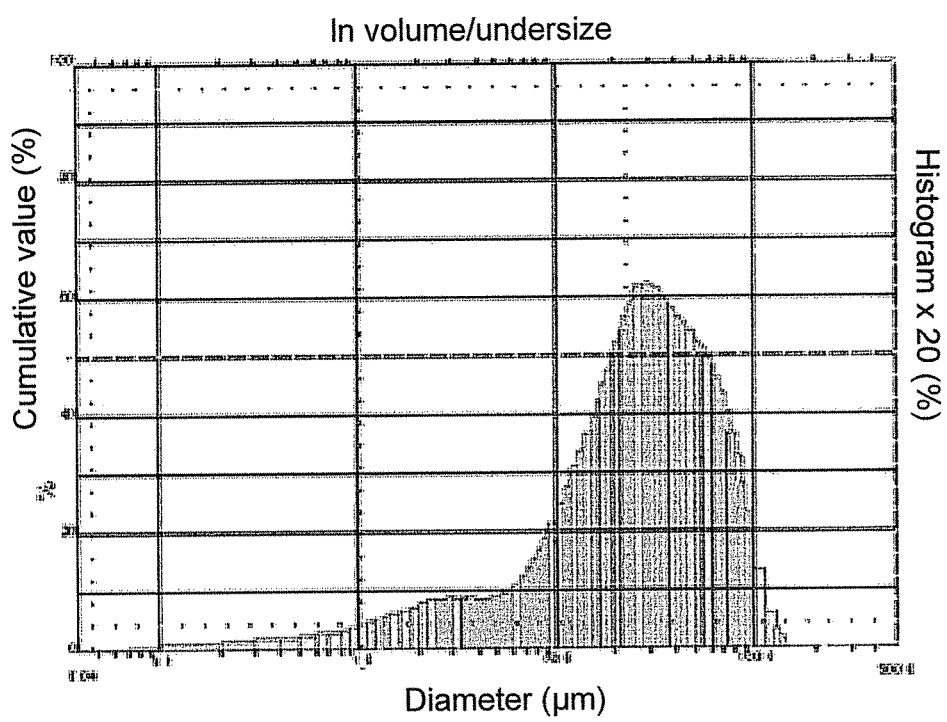
Figure 14

MECHANICALLY FUSED MATERIALS FOR POLLUTION ABATEMENT IN MOBILE AND STATIONARY SOURCES

TECHNICAL FIELD

Described are catalyst composites containing mechanically fused components, methods of making the catalyst composites, and methods of using the catalyst composites such as in pollution abatement applications.

BACKGROUND

Pollution involves the undesirable introduction of contaminants into an environment. Pollution, sometimes referred to as contaminants, cause numerous detrimental effects including instability, disorder, harm or discomfort to the physical systems or any living organisms within the environment. Pollution takes many forms including chemical substances, particulates, odors, and the like. Pollutants or contaminants can be foreign substances (such as man-made substances) or naturally occurring. Typically naturally occurring pollutants are referred to as such when natural levels are exceeded.

Motor vehicle emissions are one of the leading causes of air pollution from a mobile pollution source. Stationary pollution sources include chemical plants, coal-fired power plants, oil refineries, petrochemical plants, nuclear waste disposal activity, incinerators, large livestock farms (dairy cows, pigs, poultry, etc.), PVC factories, metals production factories, plastics factories, and other heavy industry. Poor air quality due to pollution can harm or even kill many organisms including humans. For example, air pollution is suspected of causing or exacerbating one or more of respiratory disease, cardiovascular disease, throat inflammation, chest pain, and congestion.

Pollution control involves minimizing and thereby controlling the amount of emissions and effluents that are introduced into the air, water and/or soil. Pollution control is important because without pollution control, the waste products from consumption, heating, agriculture, mining, manufacturing, transportation and other human activities, whether they accumulate or disperse, continue to degrade the natural environment. Various attempts to control and decrease pollution are currently being implemented. Despite attempts to control pollution, pollution remains a significant problem.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Provided herein are mechanically fused catalyst composites useful in pollution abatement. One aspect of the invention relates to a catalyst composite for pollution abatement containing a core and a shell at least substantially covering the core, the shell mechanically fused to the core and containing particles mechanically fused to each other, the shell comprising an active catalyst and a sorbent material, where a size ratio of the core to particles of the shell is at least about 10:1.

Another aspect of the invention relates to methods of making catalyst composites for pollution abatement involving conducting mechanical fusion on a mixture of core materials and shell materials, the shell materials comprising an active catalyst and a sorbent material, wherein a particle size ratio of the core materials to the shell materials is at least about 10:1 to provide the catalyst composite.

Yet another aspect of the invention relates to methods of forming a pollution abatement film surrounding a core involving mixing core materials and shell materials, the shell materials containing an active catalyst and a sorbent material, wherein a particle size ratio of the core materials to the shell materials is at least about 10:1; and conducting mechanical fusion on the mixture of core materials and shell materials to provide the pollution abatement film containing shell materials substantially surrounding a core particle.

Still yet another aspect of the invention relates to methods of abating pollution involving contacting a pollution containing emission with a catalyst composite containing a core and a shell at least substantially covering the core, the shell mechanically fused to the core and containing particles mechanically fused to each other, the shell containing an active catalyst and a sorbent material, where a size ratio of the core to particles of the shell is at least about 10:1.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF SUMMARY OF THE DRAWINGS

FIG. 1 shows x-ray fluorescence data for elements Zr, Si, and Cu from the catalyst composite of Example 1 in accordance with one aspect of the subject invention.

FIG. 2 shows x-ray fluorescence data for elements Zr, Ce, and Al from the catalyst composite of Example 2 in accordance with one aspect of the subject invention.

FIG. 3 shows x-ray fluorescence data for elements Al, Ce, Pd, La and Cu from the catalyst composite of Example 3 in accordance with one aspect of the subject invention.

FIG. 5 shows a micrograph of the topcoat of the catalyst composite of Example 4 before and after being subjected to milling in accordance with one aspect of the subject invention.

FIG. 12 shows a photograph and a histogram of particle size distribution of the catalyst composite of Example 1 in accordance with one aspect of the subject invention.

FIG. 13 shows a photograph and a histogram of particle size distribution of the catalyst composite of Example 2 in accordance with one aspect of the subject invention.

FIG. 14 shows a photograph and a histogram of particle size distribution of the catalyst composite of Example 3 in accordance with one aspect of the subject invention.

DETAILED DESCRIPTION

Figure 4:
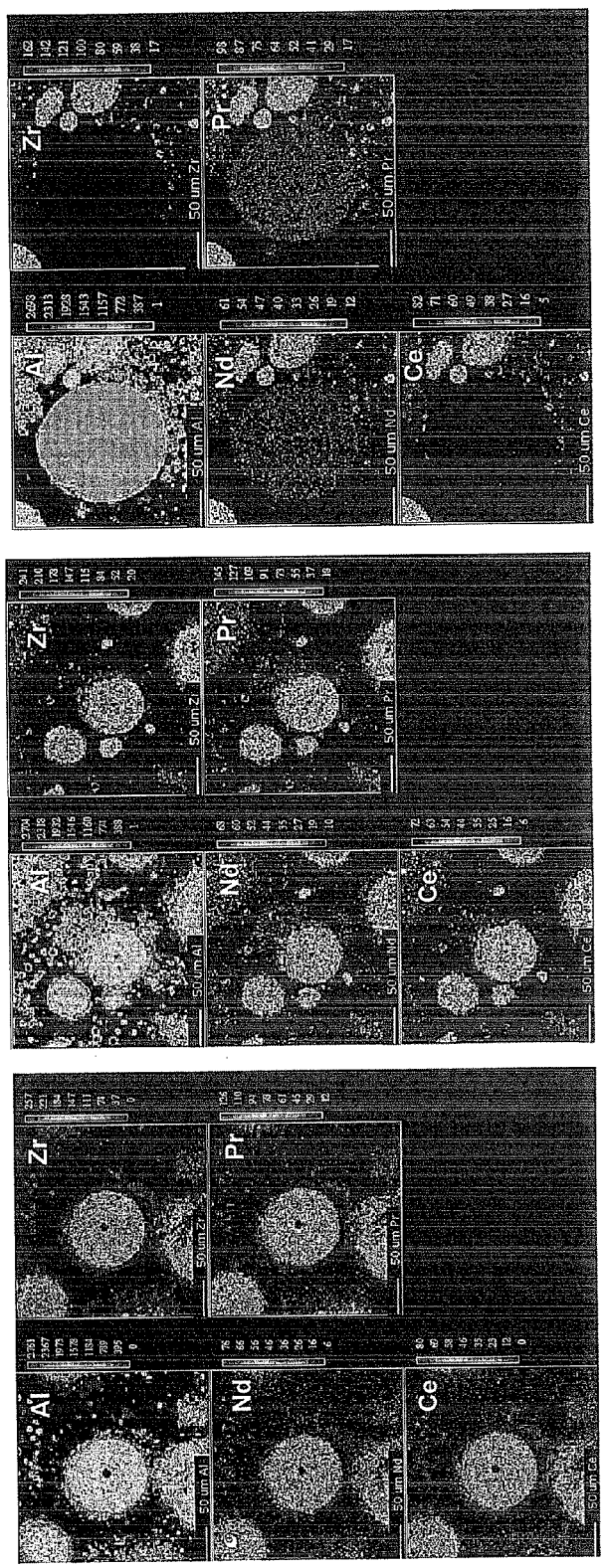
FIG. 4 shows x-ray fluorescence data and three different views for elements Al, Zr, Nd, Pr, and Ce from the catalyst composite of Example 4 in accordance with one aspect of the subject invention.

Described herein are catalyst composites containing a core and a shell (and sometimes referred to herein as host and guest materials, respectively). The catalyst composites can contain at least two shells, at least three shells, and so on. The shell is mechanically fused to the core, and the components of the shell are mechanically fused amongst each other. The shell contains an active catalyst and a sorbent material. Both the active catalyst and sorbent material are effective in abating pollution.

Mechanical fusion involves applying stress to particles by mechanical energy. The applied stress results in particle to particle adhesion without use of any binding agents. Mechanical fusion involves at least one of the following factors (and typically more than one of the following factors): de-agglomeration amongst particles, convergence between particles, increase in contact area between particles, compression-induced deformation of particles, impact-induced deformation of particles, shear force-induced deformation of particles, formation of chemical bridges between particles, and reduction of surface energy of particles. In instances where at least two sets of particles are employed, the two sets distinguished by average particle size, mechanical fusion results in the formation of a shell comprised by the set of relatively smaller particles around a core, comprised of the set of relatively larger particles.

Due to fusion of particles, the shell is relatively dense, and the core-shell particle essentially has the properties of the shell components. That is, the shell behaves in substantially the same manner as a solid, and not as loosely bonded particles surrounding a core. Consequently, compared to a particle of the same size, significant cost savings can be realized for core-shell particles particularly when the shell contains relatively expensive components without sacrificing performance.

Generally speaking, there must be a size difference of at least about 10:1 comparing particles that are employed for the core to particles that are employed to form the shell. In another embodiment, the size difference between particles that are employed for the core to particles employed to form the shell is at least about 20:1. In yet another embodiment, the size difference between particles that are employed for the core to particles employed to form the shell is at least about 40:1. In still yet another embodiment, the size difference between particles that are employed for the core to particles employed to form the shell is at least about 50:1. When comparing the size difference between particles that are employed for the core to particles employed to form the shell, the same particle standard is used for both groups. For example, the d50 size of the core particles and the shell particles is used in a given comparison.

The core is typically comprised of a catalyst support material. Examples of core or host materials include alumina, rare earth stabilized alumina, platinum group metals (PGM), impregnated alumina, zirconia, rare earth oxides, alkaline earth oxides, and mixed metal oxides (such as a mixed metal oxide containing at least one of alumina, zirconia, yttria, rare earth oxide, alkaline earth oxide). Two or more of the aforementioned materials can be employed.

The materials used to form the core have a suitable average particle size to establish at least a 10:1 size ratio by weight with the particles used to form the shell. In one embodiment, the materials used to form the core have an average particle size from about 5 microns to about 1 mm. In another embodiment, the materials used to form the core have an average particle size from about 10 microns to about 700 microns. In yet another embodiment, the materials used to form the core have an average particle size from about 25 microns to about 500 microns.

The shell is comprised of an active catalyst and a sorbent material. The shell can optionally further contain a support material and/or additive. The active catalyst and sorbent material can be comprised in the same material or in different materials. Examples of shell materials include alumina, rare earth stabilized alumina, PGM impregnated alumina, zirconia, titania, yttria, yttrium salts, rare earth oxides, rare earth salts, alkaline earth oxides, zeolites, vanadia, vanadium salts, tungsten oxide, manganese oxide, tungsten salts, cerium, ceria, and mixed metal oxides (such as a mixed metal oxide containing at least one of alumina, zirconia, yttria, rare earth oxide, alkaline earth oxide). Further examples of shell materials include catalytic metals/metal oxides such as copper, copper oxide, palladium, palladium oxide, rhodium, rhodium oxide, platinum, platinum oxide, ruthenium, ruthenium oxide, nickel, nickel oxide, gold, gold oxide, cobalt, cobalt oxide, tin, tin oxide, iridium, iridium oxide, and the like. Two or more of the aforementioned materials can be employed. The sorbent material adsorbs and/or absorbs pollution while the active catalyst facilitates conversion of pollution into a less harmful substance.

The materials used to form the shell have a suitable average particle size (by weight) to establish the at least about 10:1 size ratio with the particles used to form the core. In one embodiment, the materials used to form the shell have an average particle size from about 10 nm to about 100 microns. In another embodiment, the materials used to form the shell have an average particle size from about 25 nm to about 5 microns. In yet another embodiment, the materials used to form the shell have an average particle size from about 100 nm to about 1 micron.

The core and/or the shell may optionally contain additives (and the shell may contain additional support material). Additives include any material that facilitates mixing, mechanical fusion, catalyst composite handling/storage, and/or pollution abatement. Additives include rheology control agents, binding agents, surfactants, dispersing agents, and metal nitrates, sulfates, carbonates, phosphates, hydroxides, and oxides.

In one embodiment, in instances where either or both the core and shell contain one or more optional additives, the catalyst composite contains from about 0.01% to about 10% by weight of at least one additive. In another embodiment, the catalyst composite contains from about 0.1% to about 5% by weight of at least one additive.

Making the catalyst composite containing the shell and core involves optionally mixing together the materials used to form the core and the shell, then subjecting the mixture to mechanical fusion.

The materials for the core and shell and any optional ingredients may be optionally mixed in a wet or dry mixer. One advantage to using dry mixing is that components need not be dried before mechanical fusion. Obtaining a uniform mixture is not necessary, but some mixing is required. high shear mixer with water and a rheology control agent, such as In one embodiment, mixing is conducted in a high intensity environment, such as that supplied by a Littleford Mixer available from Littleford Day, Inc., Florence, Ky. Mixing is conducted for a time sufficient so that a fine uniform mix results.

In one embodiment, the mixture of core and shell material and optional additives is mixed in a high intensity mixer from about 5 minutes to about 100 minutes. In another embodiment, mixture of core and shell material and optional additives is mixed in a high intensity mixer from about 10 minutes to about 60 minutes.

After optional mixing, the mixed material is subjected to mechanical fusion to yield a core-shell particle. Mechanical fusion involves applying a centrifugal force to particles and directing the particles through a slit between an end of a rotor arm and a vessel wall.

During mechanical fusion, a suitable temperature is maintained to promote the formation of a core-shell catalyst composite. In one embodiment, the temperature during mechanical fusion is from about 10° C. to about 100° C. In another embodiment, the temperature during mechanical fusion is from about 20° C. to about 80° C. In yet another embodiment, the temperature during mechanical fusion is from about 30° C. to about 70° C. It is noted that the temperature may vary within a temperature range. For example, the temperature may be ramped or steadily increased during the mechanical fusion act.

During mechanical fusion, a suitable rate of rotation is maintained to promote the formation of a core-shell catalyst composite specifically effective for pollution abatement. In one embodiment, mechanical fusion is conducted using a rotor speed from about 1,000 rpm to about 10,000 rpm. In another embodiment, mechanical fusion is conducted using a rotor speed from about 2,000 rpm to about 8,000 rpm. In yet another embodiment, mechanical fusion is conducted using a rotor speed from about 2,500 rpm to about 5,000 rpm.

During mechanical fusion, a suitable slit to vessel wall clearance is maintained to promote the formation of a core-shell catalyst composite specifically effective for pollution abatement. In one embodiment, mechanical fusion is conducted using a slit to vessel wall clearance from about 0.5 mm to about 10 mm. In another embodiment, mechanical fusion is conducted using a slit to vessel wall clearance from about 1 mm to about 5 mm.

The length of time mechanical fusion is conducted primarily depends upon the temperature, the sizes of the core and shell materials, the settings on the related equipment (capacity, rpm, slit-vessel clearance, and the like), and the identity of the components (the specific type of active catalyst, the specific sorbent, and the optional additives). In one embodiment, mechanical fusion is conducted from about 30 seconds to about 5 hours. In another embodiment, mechanical fusion is conducted from about 1 minute to about 2 hours. In yet another embodiment, mechanical fusion is conducted from about 5 minutes to about 1 hour.

In one embodiment, the atmosphere in which mechanical fusion is conducted contains at least one of an inert gas, air, oxygen, steam or water vapor, and carbon dioxide. Inert gases include the noble gases and nitrogen. Noble gases include helium, neon, argon, krypton, and xenon.

Mechanical fusion can be carried out in devices available from Hosokawa Micron LTD. under the trade designations Nobilta™ and Mechanofusion® AMS.

In view of the above parameters, a typical core-shell composite material can be formed as follows. The core to shell particle ratio is preferred to be greater than 10 to 1 by weight. Cora and shell materials are calculated to yield a target core particle percent composition. Maintaining the compositional ratio, the batch size is adjusted to yield about a 9.0 L charge. Initially, the materials are mixed for 2 minutes at approximately 10% speed of the Hosokawa Micron LTD device (approximately 260 rpm). Then, motor speed (rpm) is increased to achieve a specific energy of approximately 2 (kW-Hr) per Kg of material by targeting the instantaneous power at around 6.5 kW. During the run, temperature is controlled to be less than about 50° C. using chilled water passed through the reactor jacket. As noted above, the temperature can be allowed to vary over a range and other embodiments of the invention can employ temperatures greater than 50° C.

After mechanical fusion, the catalyst composite is optionally dried and calcined to remove any remaining liquid (typically to remove remaining water). Drying is conducted in at least one of a desiccator, under a vacuum (reduced pressure), radio frequency or via conduction, Calcination is conducted using convection, conduction, radio frequency, and/or any said furnace capable of providing thermal treatment at or above 300° C. Calcination (baking) is performed for a sufficient period of time to remove any remaining volatile species from the catalyst composite.

The manner in which the catalyst composite is dried and calcined is not critical, but in many instances the drying conditions primarily depend upon at least one of the dimensions of the catalyst composite, the shape of the catalyst composite and the manner in which the catalyst composite is held. In one embodiment, the dried catalyst composite contains less than about 3% by weight free moisture. In another embodiment, the dried catalyst composite contains less than about 1% by weight free moisture. In yet another embodiment, the dried catalyst composite contains less than about 0.5% by weight free moisture.

In one embodiment, drying involves at least one of maintaining an elevated temperature (above about 35° C.) overnight, desiccation overnight, and under a vacuum overnight. When employing elevated temperatures, in one embodiment, the catalyst composite is heated from about 35° C. to about 150° C. for a time from about 5 seconds to about 6 hours. In another embodiment, the catalyst composite is heated from about 40° C. to about 300° C. for a time from about 30 seconds to about 30 minutes. In yet another embodiment, the catalyst composite is heated from about 50° C. to about 500° C. for a time from about 1 minute to about 1 hour.

The resultant catalyst composites possess a shell layer that has a thickness and level of porosity is that controllable, primarily by varying the mechanical fusion parameters and by varying the relative amounts of components within the shell. Porosity may also be controllable or is further controllable by the amount and the type of additive, such as the rheology control agent.

The shape of the catalyst composite substantially corresponds to the general shape of the core material. Typically, the resultant catalyst composite shape is spherical, substantially spherical, or oval.

The shell of the catalyst composite has its components (the active catalyst and sorbent and any optional materials) uniformly mixed therein. One benefit associated with mechanical fusion is the uniform mixing of particles of like size. Consequently, like sized but different types of shell particles are uniformly mixed before the different particles are fused together.

The catalyst composite contains a suitable amount of core materials to promote abatement of pollution. In one embodiment, the catalyst composite contains about 60% by weight or more and about 99.9% by weight or less of core material. In another embodiment, the catalyst composite contains about 70% by weight or more and about 99% by weight or less of core material. In yet another embodiment, the catalyst composite contains about 80% by weight or more and about 95% by weight or less of core material.

The catalyst composite contains a suitable amount of shell materials to promote abatement of pollution. In one embodiment, the catalyst composite contains about 0.1% by weight or more and about 40% by weight or less of shell materials. In another embodiment, the catalyst composite contains about 1% by weight or more and about 30% by weight or less of shell materials. In yet another embodiment, the catalyst composite contains about 5% by weight or more and about 20% by weight or less of shell materials.

The thickness of the shell around the core may or may not be substantially uniform. In one embodiment, the catalyst composite contains a shell that has an average thickness from about 10 nm to about 100 microns. In another embodiment, the catalyst composite contains a shell that has an average thickness from about 30 nm to about 5 microns. In yet another embodiment, the catalyst composite contains a shell that has an average thickness from about 100 nm to about 1 micron.

The resultant catalyst composite particles have an average size for effective use in pollution abatement applications. In one embodiment, the catalyst composite particles have an average size from about 5 microns to about 1 mm. In another embodiment, the catalyst composite particles have an average size from about 10 microns to about 100 microns.

In one embodiment, the catalyst composites have a bulk density from about 400 grams per liter to about 1,000 grams per liter. In another embodiment, the catalyst composites have a bulk density from about 500 grams per liter to about 800 grams per liter.

Generally, the surface area of the catalyst composite corresponds to the surface area of the shell a weighted average of the surface area of the shell components minus a rounding factor associated with mechanical fusion. However, the process of mechanical fusion does tend to limit the maximum surface area obtainable. In one embodiment, the surface area of the catalyst composite is about 5 $m^2/g$ or more and about 200 $m^2/g$ or less. In another embodiment, the surface area of the catalyst composite is about 10 $m^2/g$ or more and about 150 $m^2/g$ or less. In yet another embodiment, the surface area of the catalyst composite is about 20 $m^2/g$ or more and about 100 $m^2/g$ or less.

The catalyst composite generally has a unique distribution of pore sizes that contributes to the pollution abatement advantages. While not wishing to be bound by any theory, it is believed that the minimum surface area and/or distribution of pore sizes in the catalyst composite contributes to improved pollution abatement properties (by maximizing porosity in relatively larger pore sizes, such as larger than about 1,000 Å).

The catalyst composite generally has a longer life and/or higher pollution abatement activity compared to conventional composites made without mechanical fusion. In other words, the catalyst composite generally has a lower deactivation rate than conventionally mixed pollution abatement catalysts.

The catalyst composite described herein can be employed for pollution abatement in mobile and stationary sources. For example, the catalyst composite described herein can be employed for pollution abatement in flue and exhaust gases. In another embodiment, the catalyst composite described herein can be employed to reduce one or more of nitrogen oxide emissions, particulate or soot emissions, one or more of sulfur oxide emissions, carbon monoxide emissions, hydrocarbon emissions (especially unburned hydrocarbons), ozone, volatile organics, from a mobile or stationary pollution source. Generally speaking, pollution containing emission from a mobile or stationary source is contacted with the catalyst composite described herein. The catalyst composite functions to one or more of catalyzes the reduction of carbon/nitrogen/sulfur oxides, the reduction or oxidation of a hydrocarbon, ozone, absorption, adsorption, and the like.

Mobile pollution sources include vehicles such as cars, trucks, buses, trains, motorcycles, construction equipment, boats, ships, airplanes, dirigibles, and the like. The catalyst composite may be employed in the exhaust system of a diesel engine such as in a diesel exhaust filter or in the exhaust system of a gasoline engine, such as in a catalytic converter. Stationary pollution sources include power plants (especially coal-fired power plants), industrial sites, generators, machinery, factories, buildings, and the like.

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

EXAMPLE 1

A mixture of 90% wt. of zinc oxide particles having a d50 size of 40 microns and 10% wt. of copper-beta zeolite particles having a d50 size of 1 micron were charged to a Mechanofusion® AMS apparatus made by Hosokawa Micron LTD. A core-shell composite material having a BET ($m^2/g$) of 29 was produced.

EXAMPLE 2

A mixture of 90% wt. of lanthanum/alumina particles (4% wt. $La_2O_3$ mixed with alumina) having a d50 size of 65 microns and 10% wt. of ceria/zirconia particles having a d50 size of 4 microns were charged to a Mechanofusion® AMS apparatus made by Hosokawa Micron LTD. A core-shell composite material having a BET ($m^2/g$) of 94.1 was produced.

EXAMPLE 3

A mixture of 90% wt. of lanthanum/alumina particles (4% wt. $La_2O_3$ mixed with alumina) having a d50 size of 65 microns, 8% wt. of $Y_2O_3/La_2O_3/CeO_2/ZrO_2$ particles having a d50 size of 4 microns, and 2% wt. of palladium particles having a d50 size of 1 micron and a surface area of 10 m²/g were charged to a Mechanofusion® AMS apparatus made by Hosokawa Micron LTD. A core-shell composite material having a BET (m²/g) of 91.9 was produced. FIG. 3 shows an image of the resultant core-shell composite material.

EXAMPLE 4

A mixture of 80% wt. of milled SBa-150 alumina particles (Sasol North America) having a d50 size of 4 microns and 20% wt. of ceria/zirconia particles having a d50 size of 0.5 micron were charged to a Mechanofusion® AMS apparatus made by Hosokawa Micron LTD. A core-shell composite material having a BET (m²/g) of 113.62 was produced.

EXAMPLE 5

A mixture of 97.5% wt. of Pd/Alumina particles (6% wt. Pd mixed with SBa-90 alumina) having a d50 size of 17 microns and 2.5% wt. of nano-$CeO_2$ particles having a d50 size of 0.015 micron were charged to a Mechanofusion® AMS apparatus made by Hosokawa Micron LTD and adjust to a specific energy of about 2.02 (kW-Hr)/Kg. A core-shell composite material having a BET (m²/g) of 125.88 was produced.

EXAMPLE 6

A mixture of 97.5% wt. of Pd/$LaNiO_x$/alumina particles having a d50 size of 25 microns and 2.5% wt. of nano-$CeO_2$ particles having a d50 size of 0.015 micron were charged to a Mechanofusion® AMS apparatus made by Hosokawa Micron LTD and adjust to a specific energy of about 2.17 (kW-Hr)/Kg.

EXAMPLE 7

A mixture of 97% wt. of Pt/Pd/alumina particles (5% wt. Pt/Pd at a ratio of 1.75/1 mixed with alumina TM-100)

having a d50 size of 18 microns and 3% wt. of β-zeolite particles having a d50 size of 1 micron were charged to a Mechanofusion® AMS apparatus made by Hosokawa Micron LTD and adjust to a specific energy of about 2.06 (kW-Hr)/Kg. A core-shell composite material having a BET (m²/g) of 124.63 was produced.

EXAMPLE 8

A mixture of 97% wt. of Pd/La/alumina particles (6% wt. Pd and 4% wt. $La_2O_3$ mixed with SBa-150 alumina) having a d50 size of 18 microns and 3% wt. of nano-$ZrO_2$ particles having a d50 size of 0.012 micron were charged to a Mechanofusion® AMS apparatus made by Hosokawa Micron LTD and adjust to a specific energy of about 2.1 (kW-Hr)/Kg. A core-shell composite material having a BET (m²/g) of 111.24 was produced.

EXAMPLE 9

A mixture of 98% wt. of Pd//$CeO_2$/$ZrO_2$-alumina particles (8% wt. Pd. 10% wt. $CeO_2$, and 1% wt. $ZrO_2$ mixed with KR-160 alumina) having a d50 size of 8.9 microns and 2% wt. of nano-$ZrO_2$ particles having a d50 size of 0.012 micron were charged to a Mechanofusion® AMS apparatus made by Hosokawa Micron LTD. A core-shell composite material having a BET (m²/g) of 139.17 was produced.

EXAMPLE 10

A mixture of 98% wt. of Pd/$CeO_2$/BaO-alumina particles (6% wt. Pd, 4% wt. $CeO_2$, and 6% wt. BaO mixed with KR-160 alumina) having a d50 size of 8.7 microns and 2% wt. of nano-$ZrO_2$ particles having a d50 size of 0.012 micron were charged to a Mechanofusion® AMS apparatus made by Hosokawa Micron LTD. A core-shell composite material having a BET (m²/g) of 125.69 was produced.

BET (m²/g), pore volume, and pore distribution data for the starting materials and the core-shell composite materials of selected Examples disclosed herein are shown in Table 1.

TABLE 1

Pore volume, and pore distribution data for starting materials and core-shell composite materials

| Material Information | | Surface area, Radius and Total Pore Volume | | | Pore Distribution (cc/g) | | Between 10.000 Å and 300.000 Å |
| --- | --- | --- | --- | --- | --- | --- | --- |
| | | BET (m²/g) | Ave. Pore Radius | TPV (cc/g) | | Micro pore volume | |
| Core Material | Alumina A | 168.23 | 42.03 Å | 0.57746 | | 0.00231 | 0.46427 |
| Shell Material | Mixed Oxide | 64.84 | 67.35 Å | 0.23789 | | 0.00043 | 0.14895 |
| | Example 2 | 113.62 | 42.55 Å | 0.29437 | | 0.00123 | 0.27318 |
| Core Material | Standard Pd/Alumina | 129.42 | 53.97 Å | 0.47069 | | 0.00324 | 0.40737 |
| Shell Material | Nano-$CeO_2$ | 75.85 | 156.99 Å | 0.57170 | | 0.00621 | 0.46202 |
| | Example 5 | 125.88 | 49.72 Å | 0.43483 | | 0.00467 | 0.35894 |
| Core Material | Pt/Pd/Alumina | 131.67 | 87.88 Å | 0.64950 | | 0.00354 | 0.62951 |
| Shell Material | β-Zeolite | 516.85 | 26.48 Å | 0.42003 | | 0.15939 | 0.20390 |
| | Example 7 | 124.63 | 80.17 Å | 0.51363 | | 0.00570 | 0.50911 |
| Core Material | Standard Pd/La/Alumina | 116.61 | 48.38 Å | 0.31539 | | 0.00213 | 0.30799 |
| Shell Material | Nano-$ZrO_2$ | 12.37 | 146.71 Å | 0.19613 | | 0.00002 | 0.06036 |
| | Example 8 | 111.24 | 46.84 Å | 0.28651 | | 0.00281 | 0.28370 |
| Core Material | Pd/Ce/Zr/Alumina | 144.44 | 62.99 Å | 0.52671 | | 0.00274 | 0.50354 |
| Shell Material | Nano-$ZrO_2$ | 12.37 | 146.71 Å | 0.19613 | | 0.00002 | 0.06036 |
| | Example 9 | 139.17 | 57.95 Å | 0.44849 | | 0.00306 | 0.44503 |
| Core Material | Pd/Ce/Ba/Alumina | 131.54 | 69.89 Å | 0.58124 | | 0.00402 | 0.55783 |
| Shell Material | Nano-$ZrO_2$ | 12.37 | 146.71 Å | 0.19613 | | 0.00002 | 0.06036 |
| | Example 10 | 125.69 | 66.48 Å | 0.50676 | | 0.00354 | 0.48774 |

The Figures show x-ray fluorescence and x-ray diffraction data collected from the above described samples. FIG. 1 shows x-ray fluorescence data from the elements Zr, Si, and Cu collected from the Example 1 composite. Zr is observed having a greater concentration in the core of the composite particles. FIG. 2 shows x-ray fluorescence data from elements Zr, Ce, and Al collected from the Example 2. Al is observed having a greater concentration in the core of the composite while Zr and Ce are observed having a greater concentration in a thin shell on the surface of the composite. FIG. 3 shows x-ray fluorescence data from elements Al, Ce, Pd and La collected from the Example 3 composite. Al is observed having a greater concentration in the core of the composite while Pd and Ce are observed having a greater concentration in a thin shell on the surface of the composite. FIG. 4 shows x-ray florescence data from elements Al, Nd, Ce, Zr, and Pr collected from the composite of Example 4. FIG. 4 shows three different views taken from the composite of Example 4.

Figure 6:
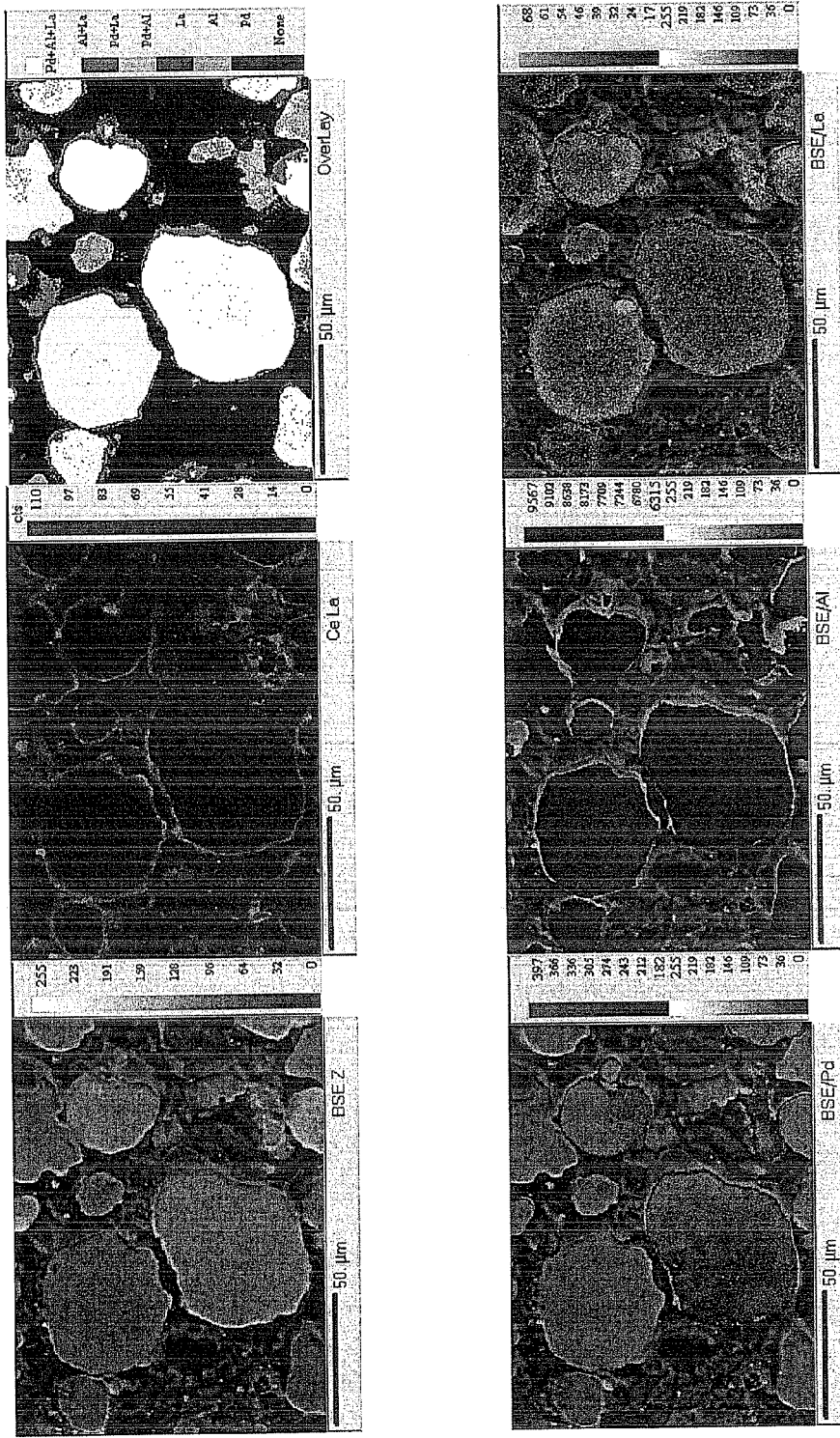
FIG. 6 shows a micrograph and x-ray fluorescence for elements Ce, Pd, Al, and La along with an overlay of the x-ray fluorescence data from the catalyst composite of Example 5 in accordance with one aspect of the subject invention.
Figure 7:
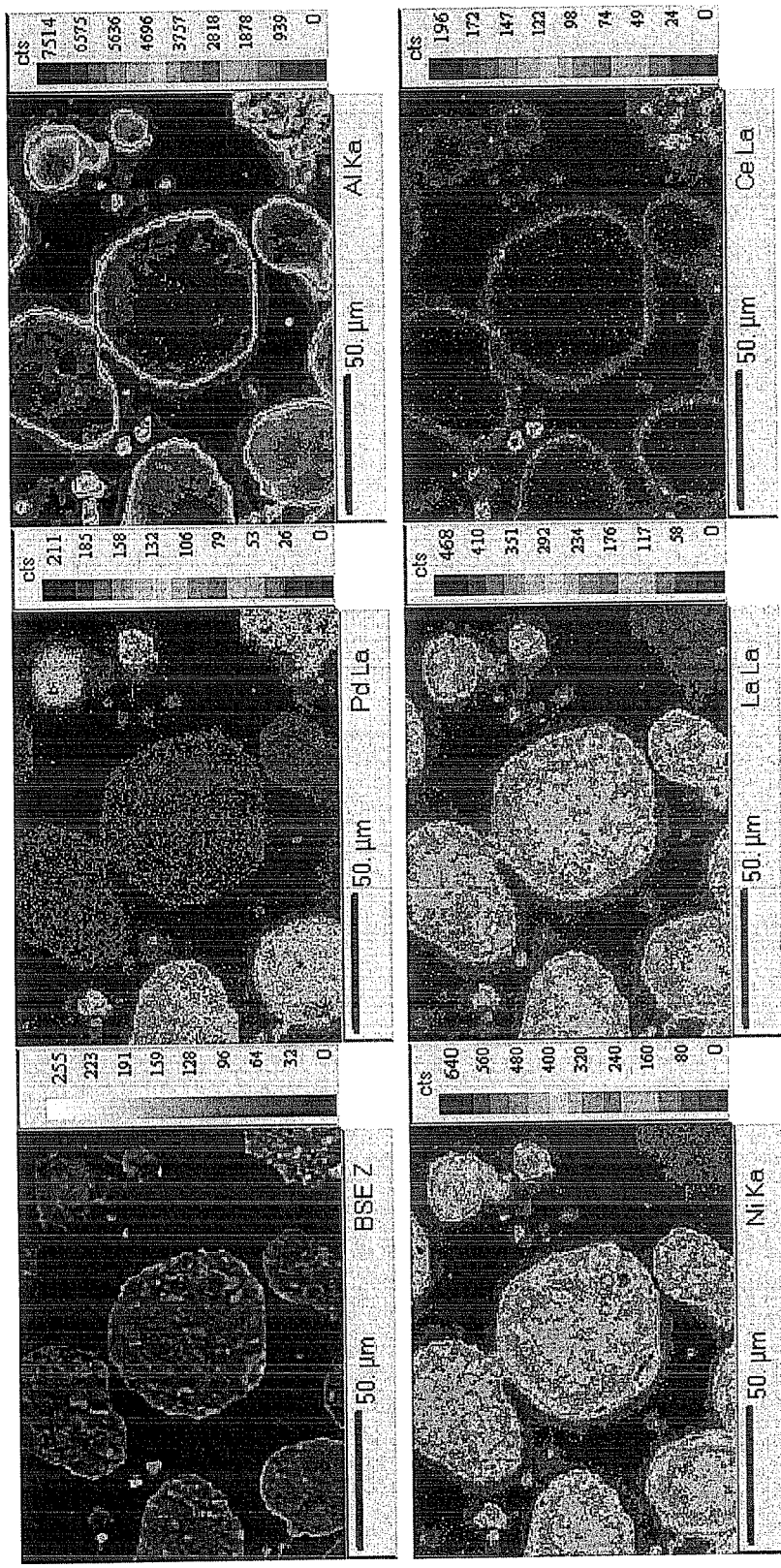
FIG. 7 shows a micrograph and x-ray fluorescence for elements Pd, Al, Ni, La, and Ce from the catalyst composite of Example 6 in accordance with one aspect of the subject invention.
Figure 8:
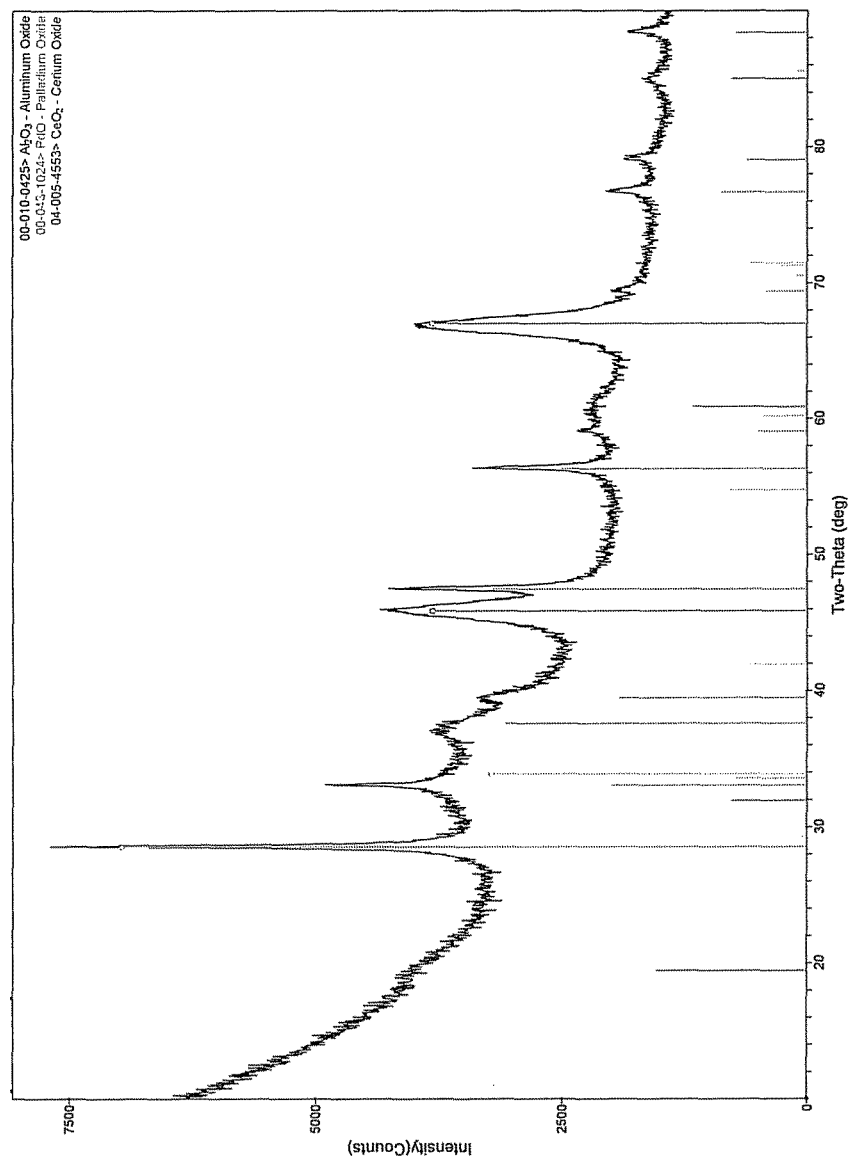
FIG. 8 shows x-ray diffraction data collected from the catalyst composite of Example 6 in accordance with one aspect of the subject invention.

FIG. 5 shows the composite of Example 4 (topcoat) before and after one pass through a miller. Little structural change occurs demonstrating significant mechanical strength. FIG. 6 shows x-ray florescence data from elements Ce, Pd, Al, and La collected from the composite of Example 5. Elements Pd, Al and La are observed in a higher concentration in the core of the composite while Ce is found in a thin shell on the surface of the composite. FIG. 7 shows x-ray florescence data from elements Pd, Al, Ni, La, and Ce collected from the composite of Example 6 (florescence observed from Ka and La transitions is noted). Element Al is observed in a higher concentration in the core of the composite while Ce is found in a thin shell on the surface of the composite. FIG. 8 shows x-ray diffraction data collected from the composite of Example 6. The pattern reveals a crystal phase comprising $CeO_2$; a crystal phase comprising Perovskite may be present be is not definite due to overlap with $CeO_2$.

Figure 9:
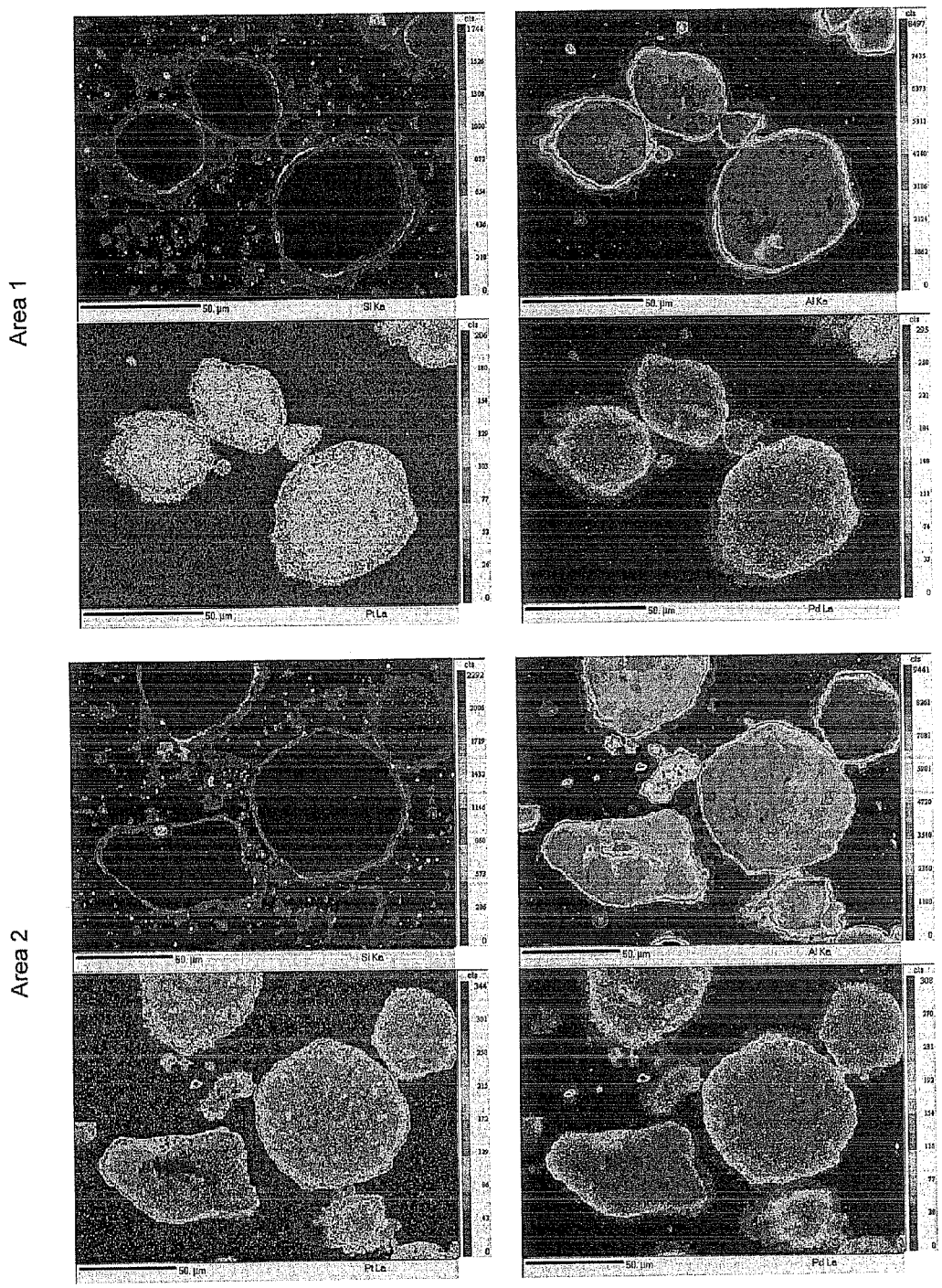
FIG. 9 shows x-ray fluorescence data and two different views for elements Si, Al, Pd, and Pt from the catalyst composite of Example 7 in accordance with one aspect of the subject invention.
Figure 10:
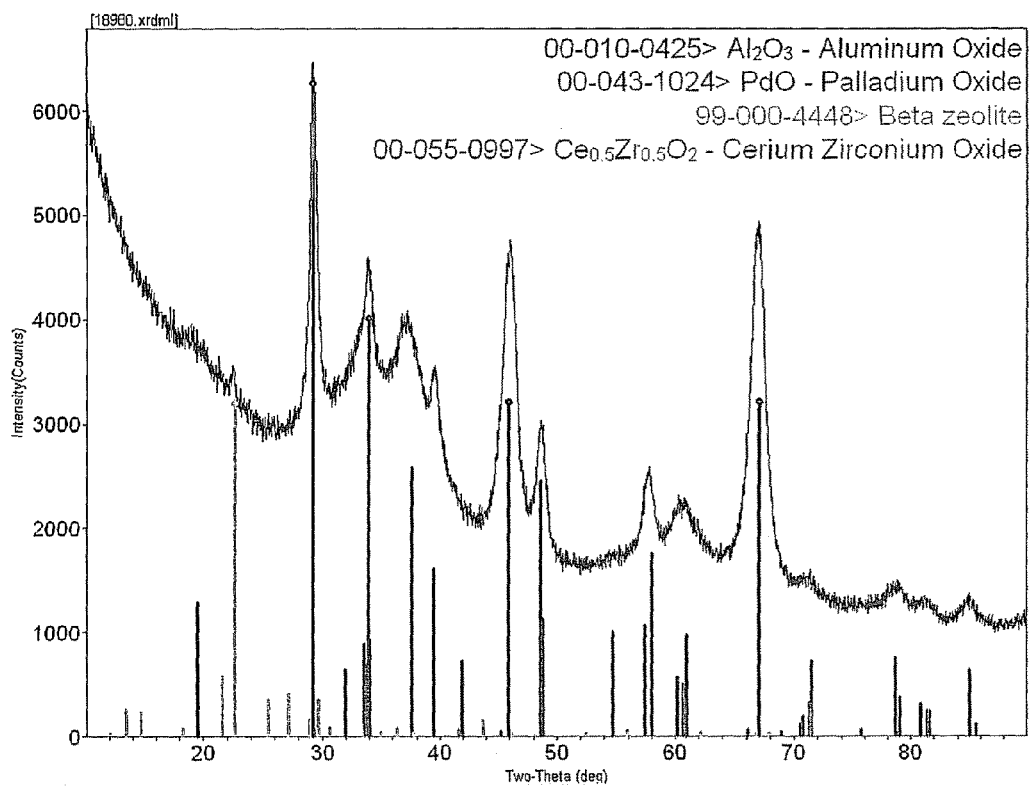
FIG. 10 shows x-ray diffraction data collected from the catalyst composite of Example 7 along with the BET of starting materials and the resulting catalyst composite of Example 7.
Figure 11:
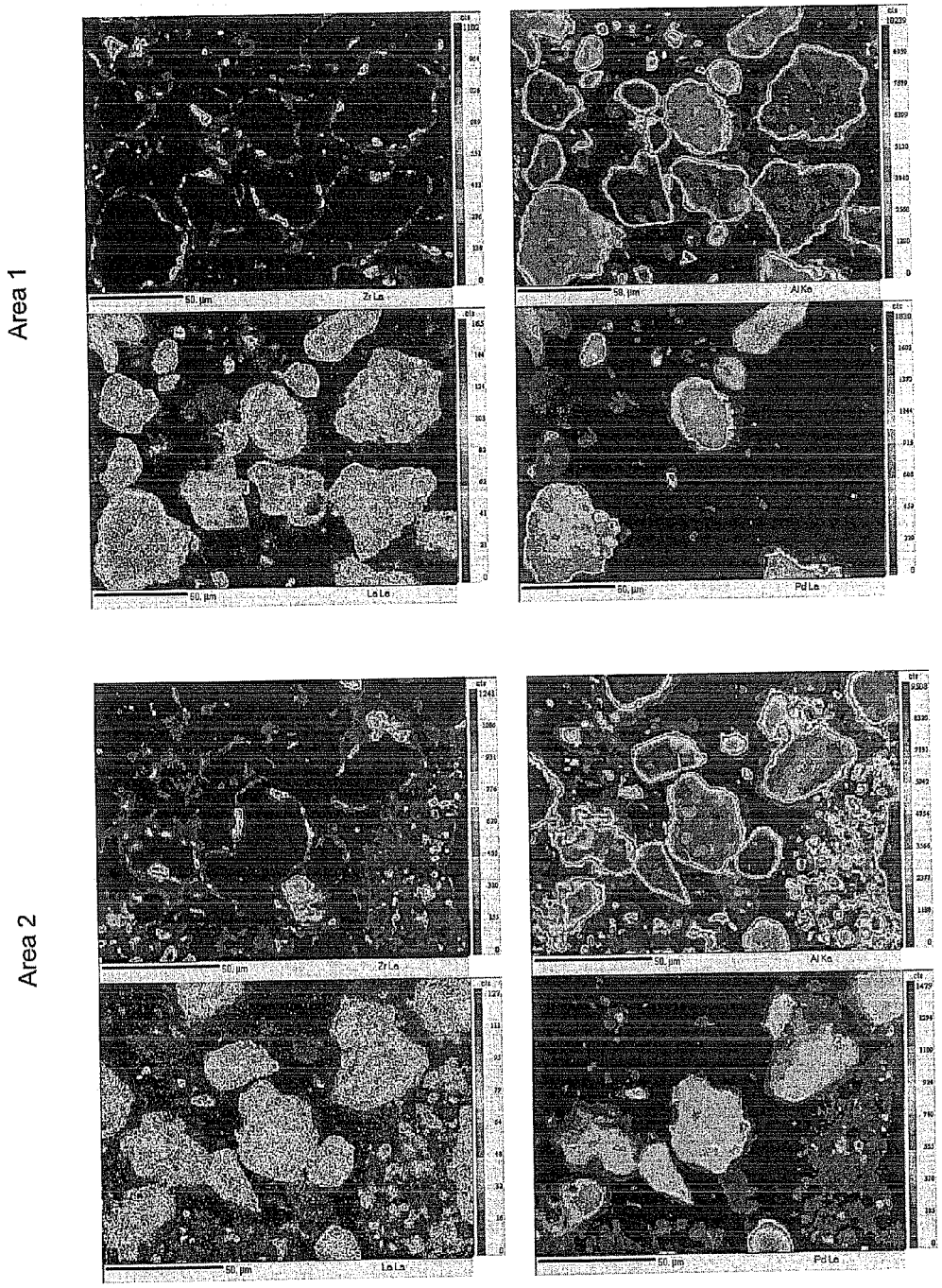
FIG. 11 shows x-ray fluorescence data and two different views for elements Zr, Al, La, and Pd from the catalyst composite of Example 8.
Figure 15:
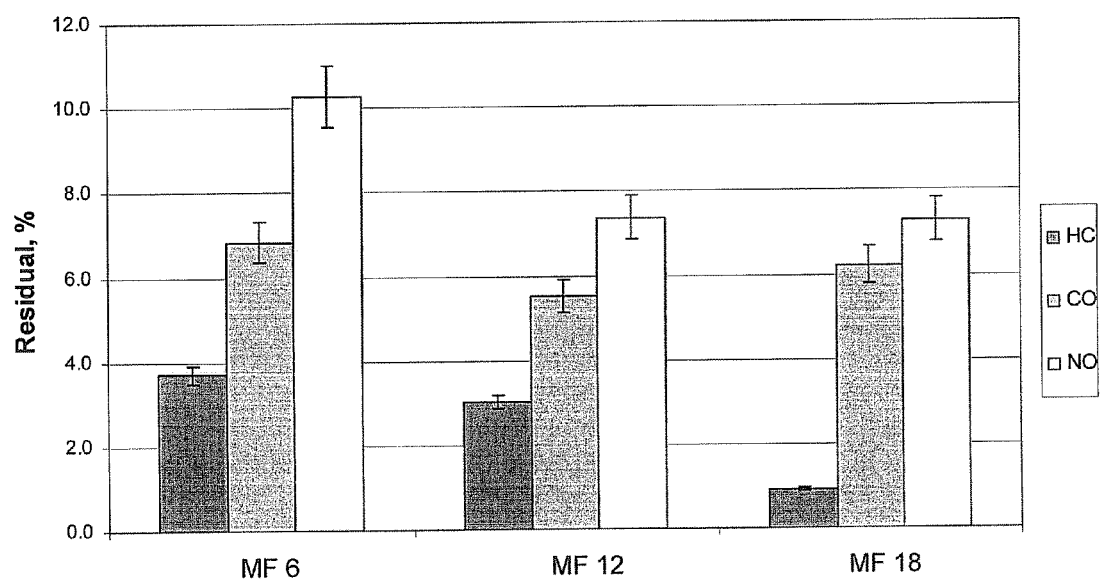
FIG. 15 shows performance of catalyst composites in accordance with aspects of the invention in converting/absorbing pollutants from motor vehicle emissions.

FIG. 9 shows x-ray florescence data from elements Si, Al, Pt, and Pd collected from the composite of Example 7 (florescence observed from Ka and La transitions is noted). Element Al is observed in a higher concentration in the core of the composite while Si is found in a thin shell on the surface of the composite. FIG. 10 shows x-ray diffraction data collected from the composite of Example 7. The pattern reveals crystal phases comprising aluminum oxide, palladium oxide, β-zeolite and cerium zirconium oxide, as shown. The BET date indicates that β-zeolite as the guest material increases the overall BET of the Example 7 composite compared to the Pt/Pd/Alumina core or host material. FIG. 11 shows x-ray florescence data from elements Zr, Al, La, and Pd collected from the composite of Example 8 (florescence observed from Ka and La transitions is noted). Element Al is observed in a higher concentration in the core of the composite while Zr is found in a thin shell on the surface of the composite. FIGS. 12 through 14 depict a photograph and a histogram of particle size distribution for the composites of Examples 1-3, respectively.

The mechanically fused catalysts were aged under air with 10% steam for 16 hours at 1000° C. and then catalytic performance was observed by monitoring conversion/absorption of hydrocarbons (HC), carbon monoxide (CO), $NO_x$ (NO) from simulated automobile exhaust. Exhaust was passed over the catalysts at a volume hourly space velocity (VHSV) of 30,000 $hr^{-1}$. FIG. 12 shows the residual amount of HC, CO, and NO present after treatment with the respective mechanically fused catalysts, where the percent residual is measured relative to untreated engine exhaust. Table 2, below, shows the data presented in FIG. 12 in numerical form along with the percent improvement in performance of Examples 8 and 10 employing a zirconia based shell relative to Example 5 employing a ceria based shell.

TABLE 2

Conversion/Absorption of HC, CO and NO by mechanically fused catalysts Examples 5, 8 and 10

| Formulation | HC | CO | NO |
|---|---|---|---|
| % Residual | | | |
| Ex. 5 ($CeO_2$) | 3.7 | 6.8 | 10.3 |
| Ex. 8 ($ZrO_2$) | 3.0 | 5.5 | 7.4 |
| Ex. 10 ($ZrO_2$) | 0.9 | 6.2 | 7.3 |
| % Improvement due to use of $ZrO_2$ Shell | | | |
| Ex. 8 | 19% | 19% | 28% |
| Ex. 10 | 76% | 9% | 29% |

As shown in Table 1 and FIG. 12, improved performance is observed with mechanically fused catalysts employing a zirconia shell. It is noted that ceria is known in the art to absorb oxygen. Without wishing to be bound by any one theory, the relatively more inert ziconia shell material may be a better support for Pd and other metal catalysts. However, mechanically fused catalysts employing zirconia or ceria function to reduce HC, CO and NO from automotive exhaust and are useful in pollution abatement.

Other than in the operating examples or where otherwise indicated, all numbers, values and/or expressions referring to quantities of ingredients, reaction conditions, etc., used in the specification and claims are reflective of the various uncertainties encountered in obtaining such numbers, values and/or expressions and are therefore to be understood as modified in all instances by the term "about." Further, where a numerical range is disclosed herein, unless otherwise indicated, such range is continuous and encompasses its minimum and maximum values as well as every value there between. In addition, it will be understood, that where more than one range is provided to describe a given characteristic, a value from a first such range can be combined with a value from a second such range to create a new range providing an alternative description of the given characteristic.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A catalyst composite for pollution abatement, comprising:
    a core, and a shell covering the core, the shell mechanically fused to the core and comprising particles mechanically fused to each other, the shell comprising an active catalyst and a sorbent material and the core comprising oxide particles,
    wherein the core oxide particles have an average particle size and the shell particles have an average particle size to provide a size ratio of the core particles to the shell particles of at least about 10:1.

2. The catalyst composite of claim 1, wherein the active catalyst facilitates conversion of pollution to a less harmful substance and the sorbent material adsorbs and/or absorbs pollution.

3. The catalyst composite of claim 1, wherein the core particles have an average size from about 5 microns to about 1 mm.

4. The catalyst composite of claim 1, wherein the particles of the shell have an average size from about 10 nm to about 100 microns.

5. The catalyst composite of claim 1, wherein the shell has a thickness from about 10 nm to about 100 microns.

6. The catalyst composite of claim 1, wherein the core comprises at least one of alumina, rare earth stabilized alumina, PGM impregnated alumina, zirconia, a rare earth oxide, an alkaline earth oxide, and a mixed metal oxide and the shell comprises at least one of alumina, rare earth stabilized alumina, PGM impregnated alumina, zirconia, titania, yttria, yttrium salts, rare earth oxides, rare earth salts, alkaline earth oxides, zeolites, vanadia, vanadium salts, tungsten oxide, manganese oxide, tungsten salts, cerium, ceria, mixed metal oxides copper, copper oxide, palladium, palladium oxide, rhodium, rhodium oxide, platinum, platinum oxide, ruthenium, ruthenium oxide, nickel, nickel oxide, gold, gold oxide, cobalt, cobalt oxide, tin, tin oxide, iridium, and iridium oxide.

7. The catalyst composite of claim 1 comprising about 60% by weight or more and about 99.9% by weight or less of the core and about 0.1% by weight or more and about 40% by weight or less of the shell.

8. The catalyst composite of claim 1, wherein the core comprises particles having an average size of from about 25 microns to about 500 microns.

9. The catalyst composite of claim 1, wherein the catalyst composite has a shape that is spherical.

10. The catalyst composite of claim 1, wherein the catalyst composite has surface area of about 10 $m^2/g$ or more and about 150 $m^2/g$ or less.

11. The catalyst composite of claim 1, wherein the catalyst composite has surface area of about 20 $m^2/g$ or more and about 100 $m^2/g$ or less.

12. The catalyst composite of claim 1, wherein the shell comprises zirconia.

13. The catalyst composite of claim 1, wherein the shell comprises ceria.

14. The catalyst composite of claim 1, wherein the shell comprises an additive selected from rheology control agents, binding agents, surfactants, and dispersing agents, and the shell has a porosity that is controlled by the amount and type of additive and mechanical fusion parameters.

* * * * *